United States Patent [19]
Webb

[11] 4,384,731
[45] May 24, 1983

[54] RECLINABLE SKATEBOARD

[76] Inventor: Ronald J. Webb, 3424 Gerlando Dr., Baton Rouge, La. 70814

[21] Appl. No.: 198,854

[22] Filed: Oct. 20, 1980

[51] Int. Cl.³ .............................................. B62D 11/00
[52] U.S. Cl. .......................... 280/87.01; 280/87.04 A; 280/291
[58] Field of Search ...................... 280/87.01, 87.04 A, 280/87.04 R, 291, 16

[56] References Cited
U.S. PATENT DOCUMENTS

| | | | |
|---|---|---|---|
| 424,164 | 3/1890 | Bankson | 280/87.01 |
| 2,859,975 | 11/1958 | Weaver et al. | 280/87.01 X |
| 3,039,784 | 6/1962 | Davis | 280/87.04 A |
| 3,391,947 | 7/1968 | Hodas | 280/87.01 X |
| 4,182,520 | 1/1980 | Stevenson | 280/87.04 A |
| 4,323,261 | 4/1982 | Samuelson | 280/87.04 A |

OTHER PUBLICATIONS

J. C. Whitney & Company Auto Parts, Catalog #362C, Copyright 1977, p. 115.

*Primary Examiner*—Robert J. Spar
*Assistant Examiner*—Donald W. Underwood
*Attorney, Agent, or Firm*—David L. Ray

[57] ABSTRACT

A skateboard having an elongated board structure with two ends, the board structure having wheels attached thereto, a headrest connected at the rear end of the board and two foot rests connected at the front end of the board, the foot rests being elevated upwardly from the board to assist in steering the board.

6 Claims, 3 Drawing Figures

RECLINABLE SKATEBOARD

BACKGROUND OF THE INVENTION

The present invention is related to skateboards, and in particular to skateboards which the rider sits or lays upon rather than stands on.

The sport of skateboarding has become extremely popular in recent years. One of the new types of skateboarding is performed by the rider lying on the board in a reclined position with the board sometimes being increased in size to accomodate the rider. However, on the conventional skateboard the rider has very little control over the board while lying in the reclining position. In some cases riders lie on the board facing the downhill direction and hold blocks of wood in their hands which they drag on the surface of the road to steer the skateboard in one direction or the other. The inability to steer the skateboard makes the risk to the rider much more severe than if the rider could exercise greater control over the board.

Furthermore, the rider while reclining on a conventional skateboard is in a very uncomfortable position since he must bend his head up if his head is in the downhill direction of the board or if he is laying on his back and his head is in the uphill direction of the board resulting in a cramped, tense position for his neck. Such a position adds to danger since the driver is tense and cannot exercise much control over the board. Furthermore, on a conventional skateboard the rider's feet must be held rigidly out in the front of the board and cannot be allowed to drag the ground. This further puts the rider in an uncomfortable strain and adds to the hazard of skateboarding.

THE INVENTION

In accordance with the present invention there is provided a skateboard having an elongated board structure with two ends, the board structure having wheels attached thereto, a headrest connected at the rear end of the board and two foot rests connected at the front end of the board, the foot rests being elevated upwardly from the board to assist in steering the board.

DESCRIPTION OF THE PREFERRED EMBODIMENTS

Figure 1:
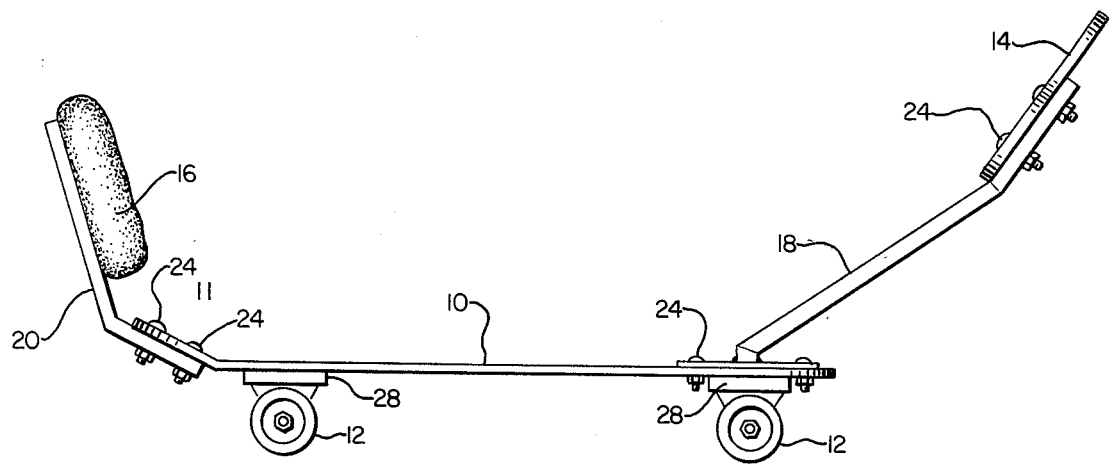
FIG. 1 is a side elevational view of the skateboard of the present invention.
Figure 2:
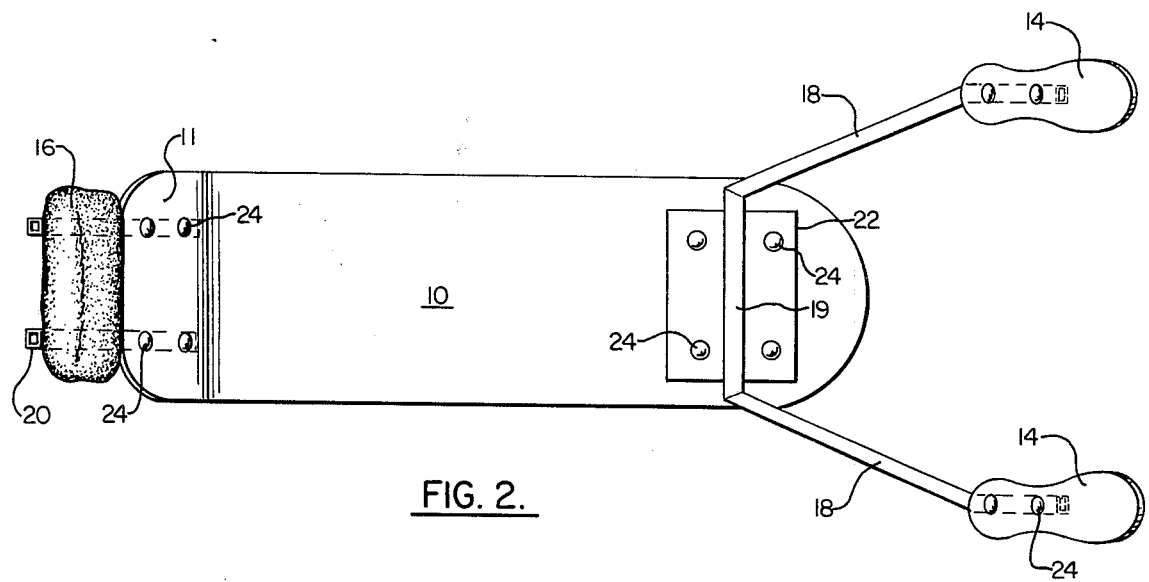
FIG. 2 is a top view of the skateboard of the present invention.
Figure 3:
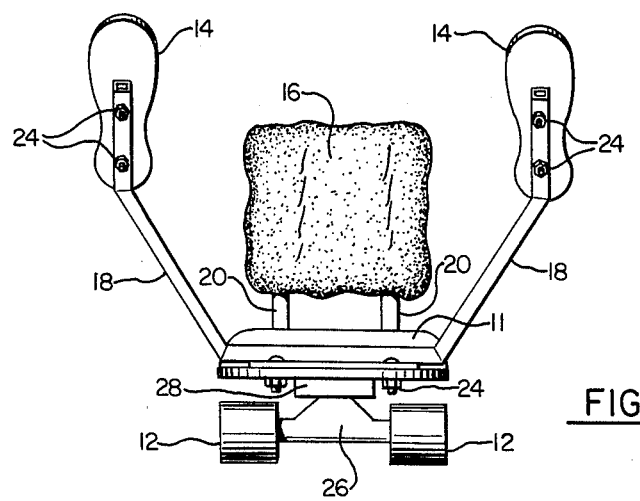
FIG. 3 is a front end elevational view of the skateboard of the present invention.

Referring now to the drawings 1 through 3, the skateboard of the present invention can be seen to have central platform board member 10 having wheels 12 connected to the bottom thereof. At the front of the board are two foot rests 14–14 attached to the bar of the board by two elongated upraised members 18. Members 18 are connected to a horizontal rod 19 which in turn is connected to front plate 22.

Rods 18 and 19 are preferably one continuous piece of metal tubing, although other conventional materials may be used if desired. Rod 19 can be attached to plate 22 by welding or any conventional means well known in the art. Preferably, rod 19 is located directly over pivot 28 and axle 26. Such a location allows the rider to exercise greater steering control.

Plate 22 is connected to board 10 by bolting through the use of bolts 24 although any other conventional means may be utilized such as screwing, welding, etc. At the rear of board 10 is an upraised portion 11 to which are attached two upraised rods 20 which support head rest 16. Rods 20 in turn are connected to the upraised portion 11 by bolts 24. Rods 20 are preferably metal rods but any conventional material may be used. If desired, the upraised portion 11 can be eliminated and the head rest could be attached by rods 20 which could be connected directly to the flat board.

The wheels 12 connected at the bottom of the board by axle 26 to pivot 28 are conventional skateboard wheels which are well known in the art. For example, U.S. Pat. No. 4,076,266 which issued Feb. 28, 1978, which is hereby incorporated by reference, shows typical skateboard pivoting wheels or, as they are sometimes referred to, trucks. Any skateboard wheel could be used which allows the wheels to turn thereby turn the skateboard when the weight is shifted from one side of the board to the other.

It is apparent to those skilled in the art that the skateboard of the present invention can be easily steered when the rider is reclining thereon by applying more weight to one of the foot rests 14 which is on the side of the board lying in the direction in which the rider wants to move. For example, if the rider wants to move to the right he leans slightly to the right and applies more weight or pressure to the right foot rest. This in turn causes the front of the board to pivot slightly and thus causes the axle 26 connected to wheels 12 to turn slightly thereby steering the board. The foot rest combined with the back rest allows the rider to assume a comfortable position on the board and to easily steer the board through merely pressing harder on one foot rest or the other. As can be seen from the configuration of the present invention, an unskilled rider can easily recline upon the skateboard of the present invention and steer it by moving his feet since the rider is lying in a prone position and has a much greater support for his body than he would standing on two feet on the skateboard. Thus, from the use of the present invention many riders will be able to enjoy the sport who could not before due to their lack of skill in balancing on two feet on a moving board.

A further advantage of the present invention is that the invention may be sold in kit form for attachment to a conventional large skateboard. The plate 22 with foot rest 14 connected thereto can be sold as one unit which can be attached to a skateboard by merely boring holes therein and attaching bolts through the holes. Furthermore, the back rest can be sold as one unit which can be attached to the rear of the board by drilling holes and attaching by bolts 24.

If desired, means for quickly attaching the foot rest and back rest of the invention to a conventional skateboard can be utilized. For example, a small screw-operated clamp may be utilized.

The platform 10 can be made from any materials well known in the art. For example, platform 10 could be made from wood, wood laminates, plastics (particularly reinforced thermoplastics), metals such as aluminum, and the like.

Although the preferred embodiments of the present invention have been disclosed and described in detail above, it should be understood that the invention is in no sense limited thereby and its scope is to be determined by that of the following claims.

What is claimed is:

1. A reclinable skateboard comprising:
   (A) a platform having a reclinable upper surface to provide support for the prone body of the user;
   (B) two pivotable wheel means connected to said platform, one of said wheel means being located at the front of said platform and the other of said wheel means being located at the rear of said platform; and
   (C) two foot rest means connected to said platform means, each of said foot rest means comprising two elongated, upraised members extending to the side of said platform, said two elongated members being attached to said platform directly over said pivotable wheel means connected to the front end of said platform to permit the direction of said skateboard to be altered by applying more or less weight to one of the foot rests.

2. The skateboard of claim 1 wherein said skateboard has a head rest means connected to the rear thereof for supporting the head of the user.

3. The skateboard of claim 2 wherein said head rest means comprises elongated rod means upraised from said skateboard having a headrest attached thereto.

4. The skateboard of claim 1 wherein said pivotal wheel means comprises two sets of wheels, one of said sets being located at the front of said platform and the other of said sets of wheels being located at the rear of said platform.

5. The skateboard of claim 4 wherein said set of pivotal wheel means comprises two wheels mounted on an axle, said axle being pivotally mounted at the approximate center thereof to said platform.

6. An apparatus for converting a skate board having two sets of pivotal wheels mounted to a skate board comprising foot rest means connectable to the front end of the skateboard for supporting the feet of the prone rider at a position elevated from the front surface of the skate board while the rider reclines on the skate board, said foot rest means comprising two elongated bars extended upwardly fron the front of said skate board and extending outwardly from the sides of said skate board, said elongated bars being attached to said platform directly over one of two sets of pivotally mounted wheels to permit the direction of the board to be altered by applying more or less weight to one of said foot rests.

* * * * *